No. 698,989. Patented Apr. 29, 1902.
A. MOFFITT.
CAR WINDOW.
(Application filed July 25, 1901.)
(No Model.) 2 Sheets—Sheet 1.
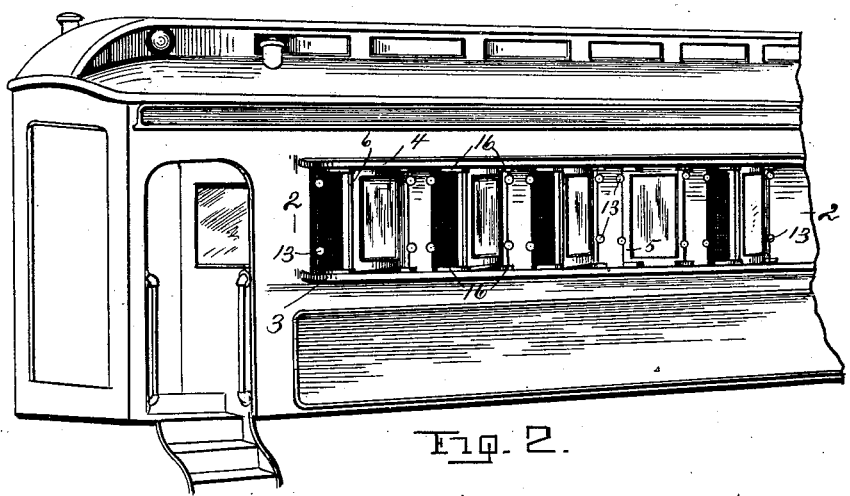
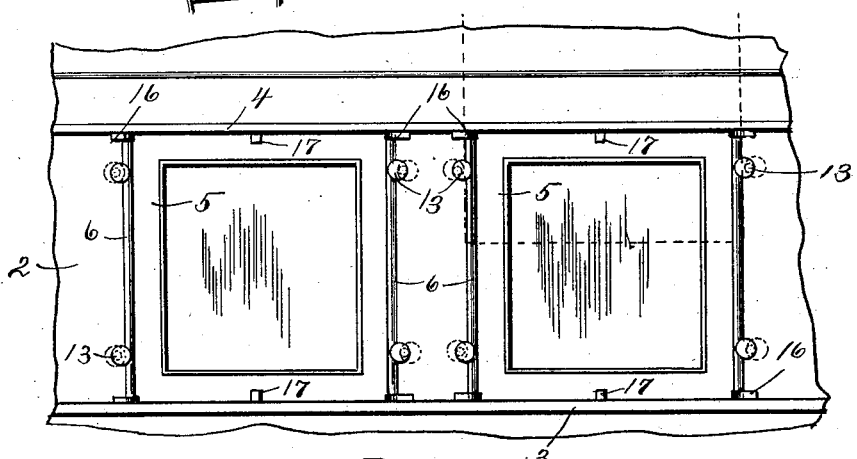
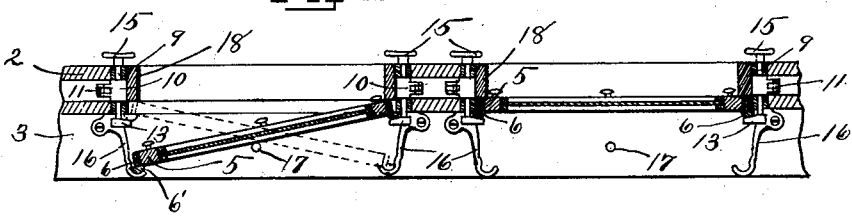
WITNESSES:
J. R. Keller
Alex. D. Mabon.
INVENTOR.
Alex. Moffitt No. 698,989. Patented Apr. 29, 1902.
A. MOFFITT.
CAR WINDOW.
(Application filed July 25, 1901.)
(No Model.) 2 Sheets—Sheet 2.
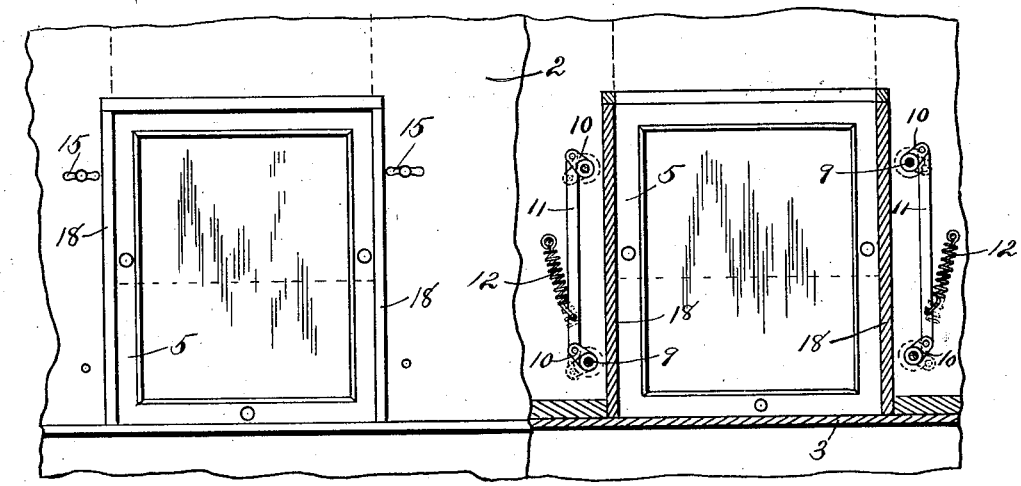
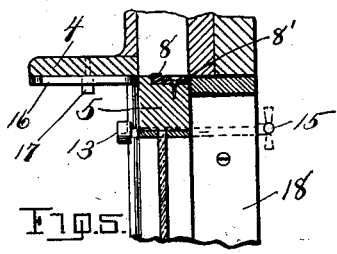
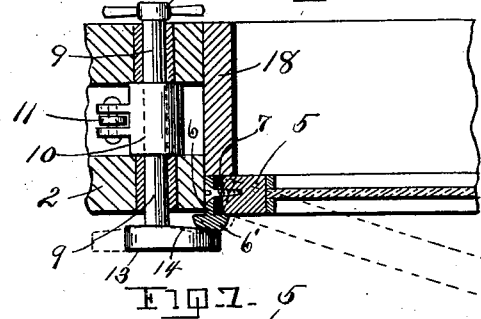
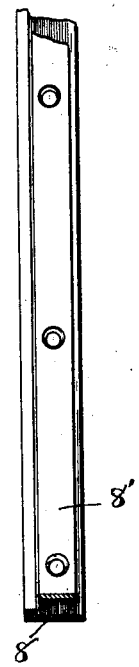
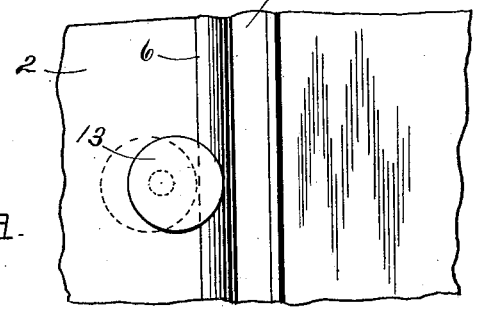
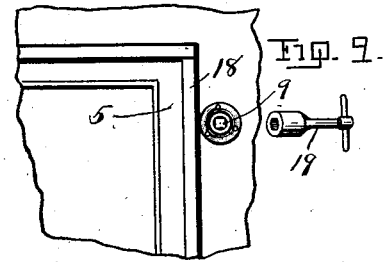
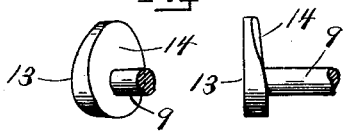
WITNESSES:
J. R. Keller
Alex. D. Mabon.
INVENTOR.
Alex. Moffitt
by Jno. Nesbit
Atty
THE NORRIS PETERS CO., PHOTO-LITHO., WASHINGTON, D. C.

UNITED STATES PATENT OFFICE.

ALEXANDER MOFFITT, OF CALIFORNIA, PENNSYLVANIA.

CAR-WINDOW.

SPECIFICATION forming part of Letters Patent No. 698,989, dated April 29, 1902.

Application filed July 25, 1901. Serial No. 69,658. (No model.)

*To all whom it may concern:*

Be it known that I, ALEXANDER MOFFITT, a citizen of the United States, residing at California, in the county of Washington and State of Pennsylvania, have invented certain new and useful Improvements in Car-Windows, of which the following is a specification, reference being had therein to the accompanying drawings.

To properly ventilate steam-railway cars, street-cars, and other vehicles, the forward movement thereof should create outwardly-flowing air-currents, which remove the impure air from within and exclude dust, cinders, &c. This principle has long been recognized and applied to the deck or roof ventilators of railway-cars.

The primary object of the present invention is to apply this principle to car and other vehicle windows by providing a window which may be opened outwardly or laterally at either vertical edge, determined by the direction of movement of the car, whereby with the forward edge of the window closed in the casing and its rear edge opened outward the air is drawn or sucked from the car, carrying with it all impurities, smoke from smoking-cars, &c. The air-currents being in a reverse direction from that which would admit dust, smoke, and cinders, the latter are entirely excluded. At the same time excessive drafts are prevented.

It is well known that when the usual vertically-moving window is opened there is a strong inflow of air, which carries with it dust, smoke, and cinders, to the great annoyance of the passengers, and particularly those who happen to be seated at the rear of the open windows. Wire screens are frequently provided to stop cinders; but even if screens were effectual in excluding these and other impurities the strong inward drafts would still be very objectionable. Furthermore, with this type of window the impure air is not removed, but remains in the car in a highly-agitated state when the train is in motion. With my improvement all of these objectionable features are obviated.

The invention consists in the novel features of construction and in the combination and arrangement of parts hereinafter fully described and claimed, and illustrated by the accompanying drawings, wherein—

Figure 1 is a view in perspective of a portion of a railway-car equipped with my improved window, one of the windows being shown closed and the other open. Fig. 2 is an outside elevation of two of the windows in closed position. Fig. 3 is a sectional plan view of Fig. 2, one of the windows being shown open in full lines and open in reverse direction in dotted lines. Fig. 4 is a view of two of the windows, one window being shown in inside elevation and the other window shown in vertical section. Fig. 5 is a vertical cross-sectional view with the window closed. Fig. 6 is a sectional plan view of a portion of a window with its locking mechanism, the window being shown closed in full lines and open in dotted lines. Fig. 7 is an outside elevation of the mechanism shown in Fig. 6. Fig. 8 is a detail view of the window-locking cams. Fig. 9 is a detail view illustrating a detachable key mechanism for operating the window-securing devices. Fig. 10 is a detail view of one of the sealing-strips.

Referring to the drawings, 2 represents the wall of the car, 3 the projecting window-sill, and 4 an outwardly-projecting ledge at the top of the window-opening.

5 represents the window frame or sash, which may be raised and lowered in the usual manner, the car-wall being constructed to permit of such movement. The projecting portion of sill 3 and ledge 4 are parallel, and the distance therebetween is approximately the same as the height of the sash. Secured to the vertical edges of the latter are the metallic T-shaped strips 6, which confine strips of rubber 7 for impinging the frame and sealing the window when the latter is closed. Secured to the top and bottom edges of the sash by metallic strips 8' are L-shaped rubber strips 8, the edges of which impinge the casing and sill 3, thus sealing the window top and bottom.

Mounted in the car-wall adjacent each side of the window-opening are two horizontal shafts 9, carrying T-sockets 10. The arms of these sockets are connected by link 11, and uniting with this link is one end of coiled spring 12, the opposite end thereof being secured to the car-wall, thus maintaining the window-securing mechanism normally in operative position. Mounted eccentrically on the outer projecting end of each shaft 9 is head 13, with its inner cam-shaped face 14 in engagement with the outer rounded portion 6' of strip 6. Spring 12 is so arranged as to normally maintain heads 13 in this engagement, and thus each vertical edge of the window is secured at two points, preferably adjacent its upper and lower ends. The cam-shaped faces 14 of heads 13 have a constant wedging action on strip 6, the same being maintained by the pull of spring 12, so that the window is held securely closed. The inner ends of the uppermost shafts 9 project within the car and carry handles 15, or the shaft ends may be reduced and squared for the reception of removable key 19, as may be preferred, and by this means the shafts may be so turned as to disengage heads 13 from strips 6 and permit of the released edge of the window being moved outward, as shown in Figs. 1 and 3. When the window is thus turned, the strip 6 and heads 13 at the opposite vertical edge thereof constitute a hinge, which has sufficient range to afford the necessary swinging movement. The sash is prevented from edgewise displacement by hook-shaped spring-arms 16, secured to sill 3 and ledge 4. These arms also limit the outward movement of the window and impinge and hold the same open. The stop 17 may also be arranged centrally on the sill for the purpose of limiting the outward movement. The vertical edges of each window may be moved outward or opened interchangeably, according to the direction of movement of the car, the opening being always toward the rear. The window may also be raised and lowered as may be required for cleaning or other purposes. For gaining access to the mechanism within the car-wall it is preferable to have vertical stop-strips 18 removable.

With the mechanism equipped with handles 15 the windows may be opened and closed by the passengers; but with the removable key 19, Fig. 9, the windows are under the control of the car attendant, which may in some cases be desirable.

With all of the open windows opening rearward the impure air is drawn from the car and very effectual ventilation is had without subjecting the passengers to annoying drafts. Also with this improvement a window may be open at one seat without disturbing the occupants of adjacent seats.

While the invention has been shown and described as applied to car-windows, the same may be used on buildings and other structures, with the several adjustments available for securing effective ventilation regardless of the direction of prevailing winds or breezes and without creating annoying drafts.

Having thus fully described my invention, what I claim as new, and desire to secure by Letters Patent, is—

1. The combination of a casing, an outwardly-movable window therein, and window-securing devices mounted in the casing at opposite sides of the window between the upper and lower ends of the latter and adapted to overlap the outer face of the window, whereby the window may be released at either vertical edge with the securing devices at the opposite edge serving as a hinge, substantially as shown and described.

2. The combination of a casing, an outwardly-movable window therein having its opposite vertical edges rounded, movable securing devices on the outer side of the casing at opposite sides of the window and adapted to overlap the said rounded vertical edges thereof, whereby the window may be released and moved outward at either vertical edge with its opposite rounded edge and the securing devices overlapping the same and coöperating to form a hinge, substantially as shown and described.

3. The combination of a casing, an outwardly-movable window therein having its opposite vertical edges rounded, rotatable heads eccentrically mounted on the outer side of the casing at opposite sides of the window and adapted to overlap the said rounded vertical edges thereof, whereby the window may be released and moved outward at either vertical edge with its opposite rounded edge and the heads overlapping the same coöperating as a hinge, substantially as shown and described.

4. The combination of a casing, an outwardly-movable window fitted therein, shafts mounted transversely in the casing at opposite sides of the window, an operative connection between shafts at each side of the window whereby they are caused to turn together, and window-securing devices mounted on the shafts and operated thereby, substantially as shown and described.

5. The combination of a casing, an outwardly-movable window fitted therein, two window-securing devices operatively mounted in the casing at each side of the window, and a connection between said devices, whereby they are caused to operate together, substantially as shown and described.

6. The combination of a casing having a window-opening, an outwardly-projecting horizontal ledge both above and below the opening, an outwardly-movable window fitted in the opening, and securing devices operatively mounted in the casing and adapted to overlap the vertical edges thereof, substantially as shown and described.

7. The combination of a casing, a sash, metallic strips secured to the vertical edges of the sash, said strips having outward projections, and locking devices adapted to removably engage the strip projections, substantially as shown and described.

8. The combination of a casing, the window-sash, metallic strips secured to the vertical side edges of the sash, the outer edges of said strips having outwardly-rounded projections and locking devices mounted in the casing and adapted to removably engage the rounded portions of the metallic strips, substantially as shown and described.

9. The combination of a casing, a window-sash T-shaped metallic strips secured to the opposite vertical edges of the sash, the outwardly-projecting head portions of said strips being rounded, and heads eccentrically mounted in the casing and adapted normally to overlap said rounded strip-heads, substantially as shown and described.

10. The combination of a casing, an outwardly-movable window fitted therein, the shafts mounted transversely in the casing, the shafts on each side of the casing being operatively connected for causing the same to turn in unison, window-securing devices carried by the shafts, and a spring for maintaining said devices normally in operative position, substantially as shown and described.

In testimony whereof I affix my signature in presence of two witnesses.

ALEXANDER MOFFITT.

Witnesses:
J. M. NESBIT,
ALEX. S. MAHON.